United States Patent [19]

Shirota

[11] Patent Number: 4,925,279
[45] Date of Patent: May 15, 1990

[54] TELECENTRIC F-θ LENS SYSTEM
[75] Inventor: Hiroyuki Shirota, Kyoto, Japan
[73] Assignee: Dainippon Screen Mfg. Co., Ltd., Japan
[21] Appl. No.: 409,632
[22] Filed: Sep. 19, 1989
[30] Foreign Application Priority Data Sep. 20, 1988 [JP] Japan ................................. 63-237141

[51] Int. Cl.$^5$ ............................................. G02B 13/22
[52] U.S. Cl. ..................................... 350/415; 350/465
[58] Field of Search ................................. 350/415, 465

[56] References Cited
U.S. PATENT DOCUMENTS
1,945,977  2/1934  Oswald ................................. 350/415

Primary Examiner—Bruce Y. Arnold
Assistant Examiner—Rebecca D. Gass
Attorney, Agent, or Firm—Ostrolenk, Faber, Gerb & Soffen

[57] ABSTRACT

The present invention is directed to a telecentric f-θ lens system which includes first and second lens groups. The first lens group includes: first lens set having an entrance pupil and a positive power first lens in the form of meniscus, a negative power second lens, and positive power third and fourth lenses in the form of meniscus. The second lens group includes a fifth lens having a positive power. The telecentric f-θ lens system therefore has a flat image surface.

4 Claims, 7 Drawing Sheets

FIG.4A
FIG.4B
FIG.4C
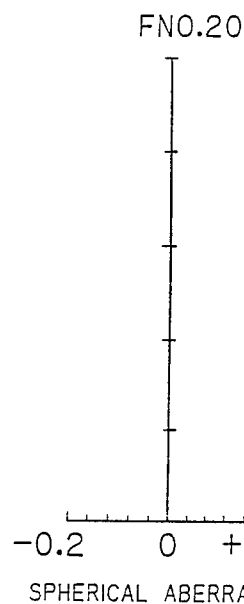
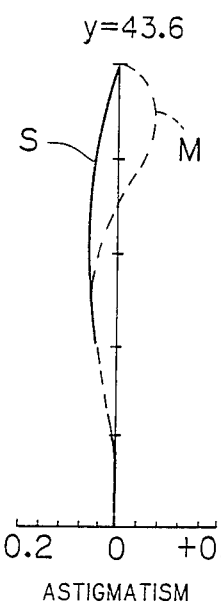
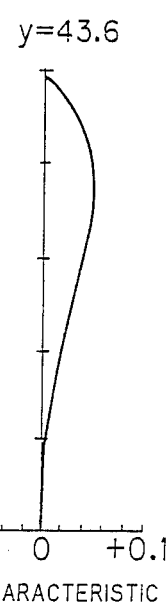
-0.2  0  +0.2    -0.2  0  +0.2    -0.1  0  +0.1
SPHERICAL ABERRATION    ASTIGMATISM    fθ CHARACTERISTIC
FIG.5A
FIG.5B
FIG.5C
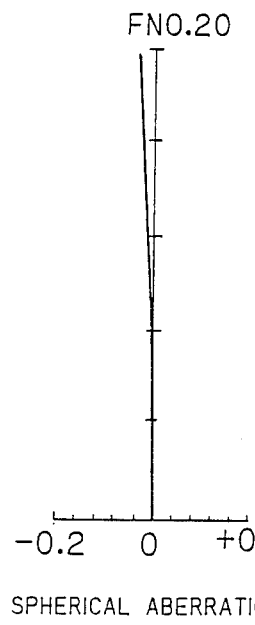
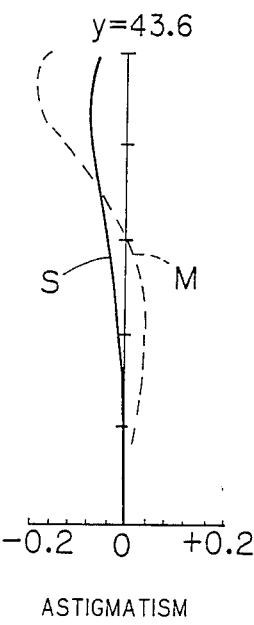
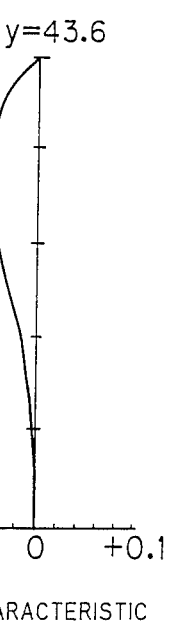
-0.2  0  +0.2    -0.2  0  +0.2    -0.1  0  +0.1
SPHERICAL ABERRATION    ASTIGMATISM    fθ CHARACTERISTIC FIG. 6A
FIG. 6B
FIG. 6C
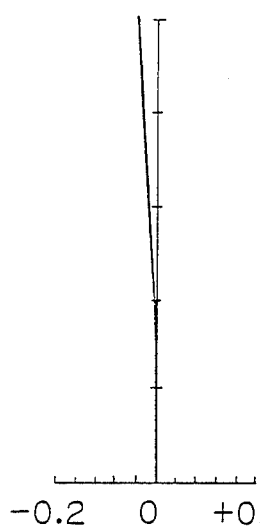
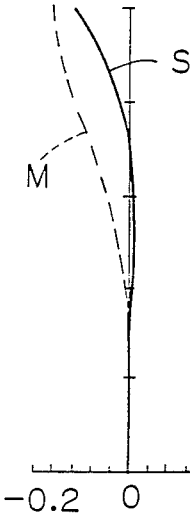
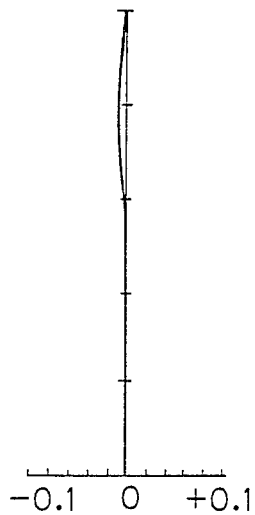
SPHERICAL ABERRATION  ASTIGMATISM  fθ CHARACTERISTIC
FIG. 7A
FIG. 7B
FIG. 7C
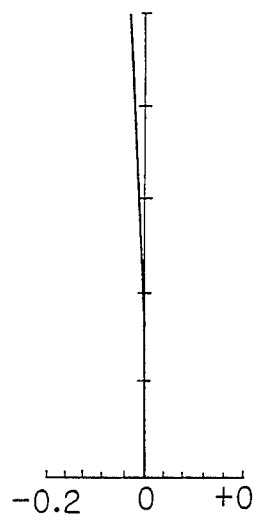
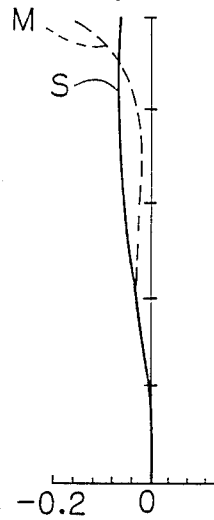
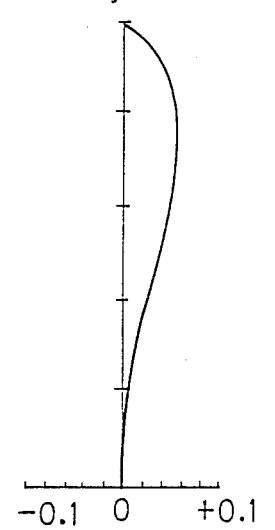
SPHERICAL ABERRATION  ASTIGMATISM  fθ CHARACTERISTIC

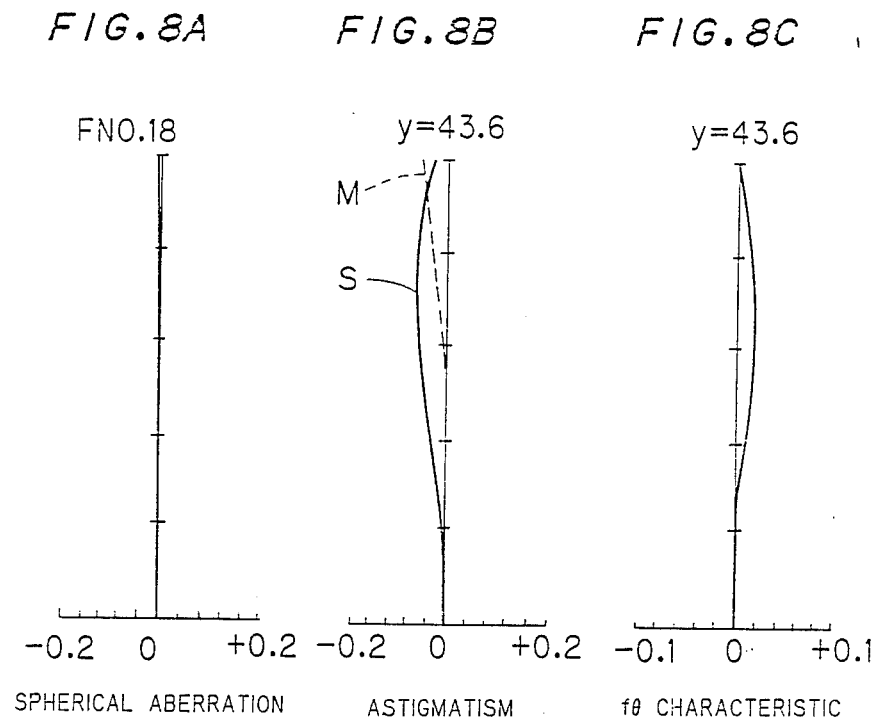
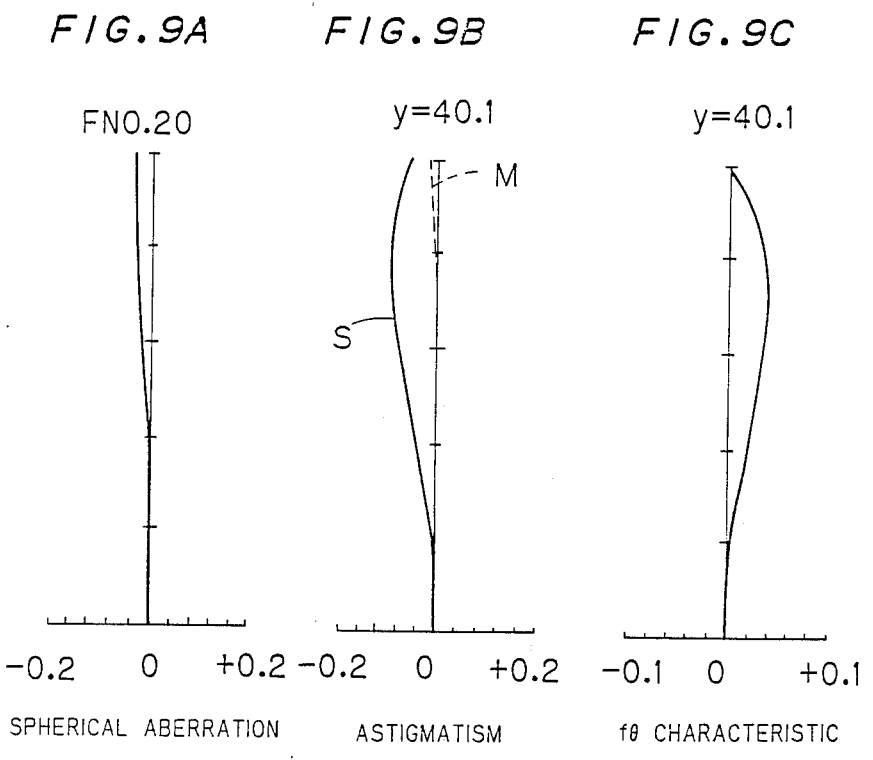

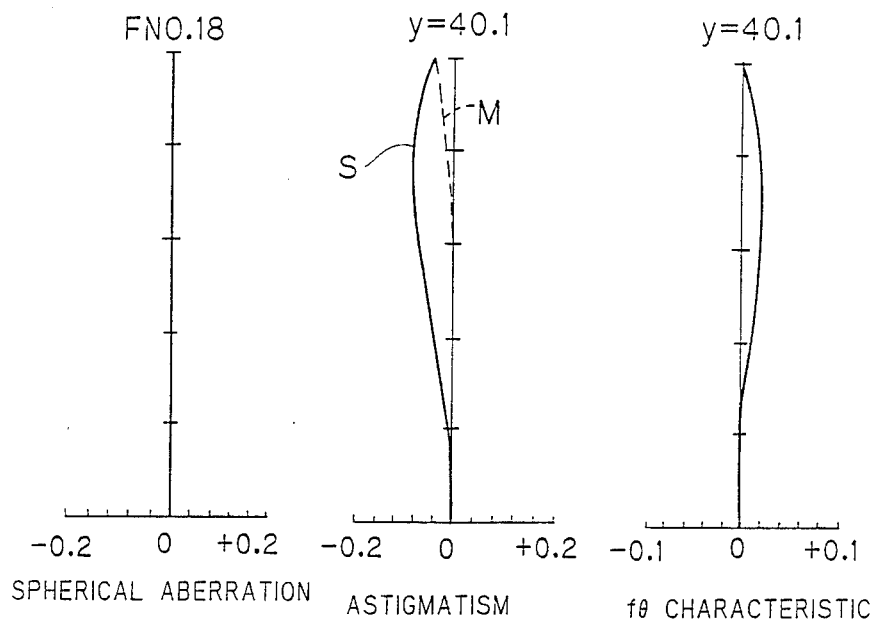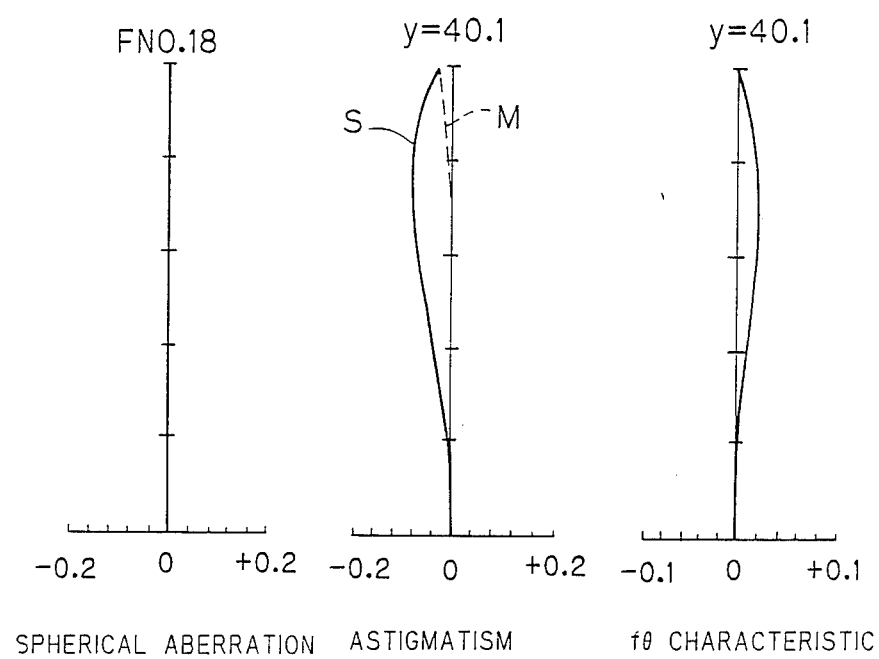

TELECENTRIC F-θ LENS SYSTEM

BACKGROUND OF THE INVENTION

1. Field of the Invention

The present invention relates to an f-θ lens system, and more particularly, it relates to a telecentric f-θ lens system which is applied to an optical beam scanner such as a laser printer.

2. Description of the Prior Art

An f-θ lens system satisfies:

$$y = f \cdot \theta$$

Where y represents the distance from an optical axis to a beam spot on an image formation surface to be scanned, f represents the focal length of the f-θ lens system and θ represents the angle of incidence of the beam upon the lens system. Therefore, when a laser beam is applied to a polygon mirror, which mirror is rotated at a constant angular velocity while imaging a beam reflected by the polygon mirror on an image formation surface through the f-θ lens system, the beam spot is moved on the image formation surface at a constant speed. In a conventional optical beam scanner, therefore, the polygon mirror is generally combined with the f-θ lens system in order to move the beam spot on the image formation surface at a constant speed.

Further, the conventional optical beam scanner employs a telecentric optical system in order to prevent misregistration. This is because all principal rays enter substantially vertically an image formation surface in the telecentric optical system, to cause extremely small misregistration even if the image formation surface is displaced in the direction of an optical axis, for example, as is well known in the art.

Therefore, a telecentric f-θ lens system is employed in a laser printer etc. particularly requiring that a laser beam is incident upon the image formation surface with high accuracy. For example, Japanese Patent Laying-Open Gazettes Nos. 195211/1984 and 299927/1987 disclose telecentric f-θ lens systems of this type.

FIG. 1 illustrates the structure of a conventional telecentric f-θ lens system, which is disclosed in the first of the aforementioned gazettes. (Japanese Patent Laying-Open Gazette No. 195211/1984). As shown in FIG. 1, the conventional telecentric f-θ lens system is formed by a negative lens $L_{12}$ whose concave surface $S_{12}$ is directed toward an entrance pupil EP, positive meniscus lenses $L_{13}$ and $L_{14}$ and a positive plano-convex lens $L_{15}$, and these lenses $L_{12}$ to $L_{15}$ are arranged in order from the entrance pupil EP side toward an image formation surface IS side. FIGS. 2A and 2B show spherical aberration and astigmatism of the telecentric f-θ lens system shown in FIG. 1, respectively.

A telecentric f-θ lens system disclosed in the latter gazette (Japanese Patent Laying-Open Gazette No. 299927/1987) is similar in structure to that shown in FIG. 1, except that the f-θ lens system has been corrected for chromatic aberration.

In a conventional telecentric f-θ lens system having the aforementioned structure, the curve of the astigmatism is generally inclined toward the negative side as shown in FIG. 2B. In order to obtain a flat image surface, therefore, it is necessary to also incline the curve of the spherical aberration toward the negative side.

However, the curve of the spherical aberration is inclined toward the positive side in the conventional telecentric f-θ lens system, as shown in FIG. 2A. Thus, a flat image surface cannot be obtained in the conventional telecentric f-θ lens system.

Further, higher resolution is generally expected from an optical beam scanner. To this end, it is necessary to reduce the diameter of a beam spot. Thus, the F-number must be minimized.

SUMMARY OF THE INVENTION

The present invention is directed to a telecentric f-θ lens system. The telecentric f-θ lens system comprises: (a) a first lens group having an entrance pupil, which includes (a-1) a first lens in the form of meniscus having a positive power whose concave surface is directed to the entrance pupil, (a-2) a second lens having a negative power, and (a-3) third and fourth lenses in the form of meniscus having a positive power, respectively; and (b) a second lens group including a fifth lens having a positive power. In the telecetric f-θ lens system, the first through fifth lenses are successively disposed in order from the entrance pupil side.

In an aspect of the present invention, the telecentric f-θ lens system satisfies the following:

$$-0.65 < (r_1/f) < -0.25$$

$$0.4 < (d_8/f) < 1.16$$

$$1.61 < (f_5/f) < 3.5$$

where $r_1$ is the radius of curvature of the concave surface of the first lens; f is the focal length of the system; $d_8$ is the distance between the fourth and fifth lenses; and $f_5$ is the focal length of the fifth lens.

Further, the present invention is also directed scanning to a system for scanning an optical beam on a recording surface. The scanning system comprises: a light source for generating an optical beam; a deflector for deflecting the optical beam going out from the light source; and a telecentric f-θ lens system for imaging the optical beam deflected by the deflector on the recording surface, which comprises: (a) a first lens group having an entrance pupil, which includes (a-1) a first lens in the form of meniscus having a positive power whose concave surface is directed to the entrance pupil, (a-2) a second lens having a negative power, and (a-3) third and fourth lenses in the form of meniscus having a positive power, respectively; and (b) a second lens group including a fifth lens having a positive power.

A principal object of the present invention is to provide a telecentric f-θ lens system which has an F-number of not more than 20, small spherical aberration, astigmatism and the like, and a flat image surface.

Another object of the present invention is to provide a scanning system which can scan an optical beam on a recording surface with high resolution.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A, 4B and 4C illustrate spherical aberration, astigmatism and f-θ characteristic of a first example, respectively;

FIGS. 5A, 5B and 5C illustrate spherical aberration, astigmatism and f-θ characteristic of a second example, respectively;

FIGS. 6A, 6B and 6C illustrate spherical aberration, astigmatism and f-θ characteristic of a third example, respectively;

FIGS. 7A, 7B and 7C illustrate spherical aberration, astigmatism and f-θ characteristic of a fourth example, respectively;

FIGS. 8A, 8B and 8C illustrate spherical aberration, astigmatism and f-θ characteristic of a fifth example, respectively;

FIGS. 9A, 9B and 9C illustrate spherical aberration, astigmatism and f-θ characteristic of a sixth example, respectively;

FIGS. 10A, 10B and 10C illustrate spherical aberration, astigmatism and f-θ characteristic of a seventh example, respectively;

FIGS. 11A, 11B and 11C illustrate spherical aberration, astigmatism and f-θ characteristic of an eigth example, respectively.

DESCRIPTION OF THE PREFERRED EMBODIMENTS

Figure 1:
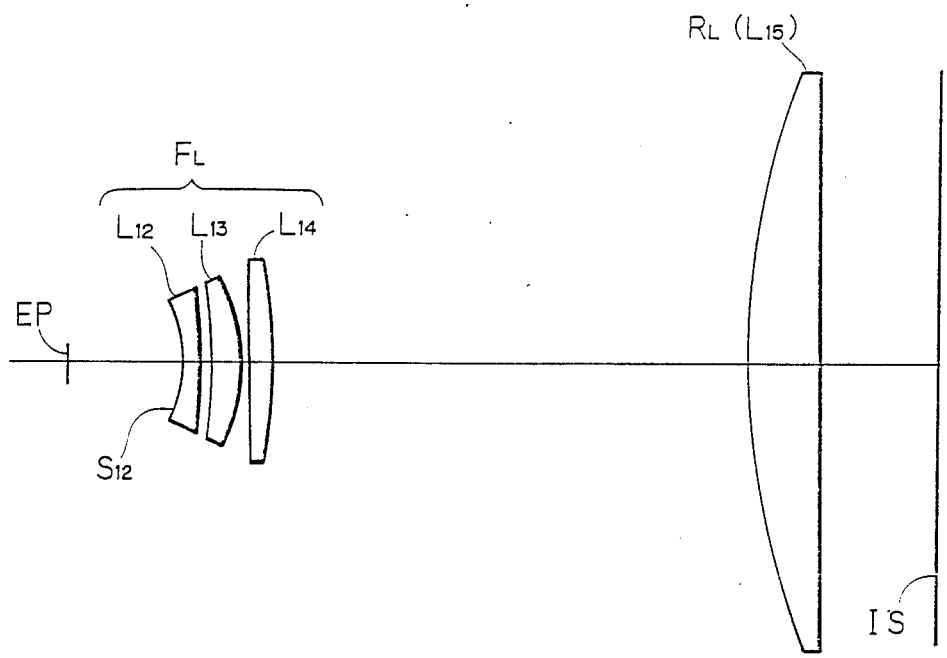
FIG. 1 illustrates the structure of a conventional telecentric f-θ lens system.
Figure 2A:
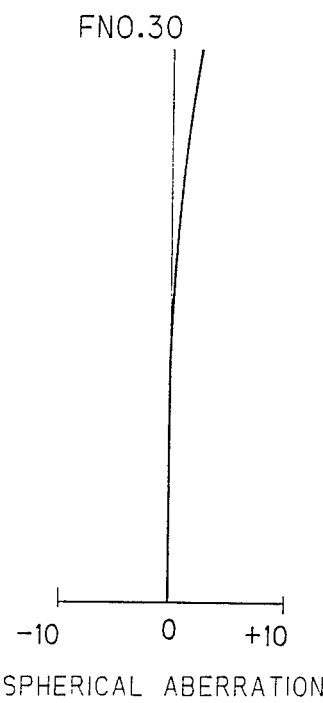
FIGS. 2A and 2B illustrate spherical aberration and astigmatism of the conventional f-θ lens system shown in FIG. 1, respectively.
Figure 2B:
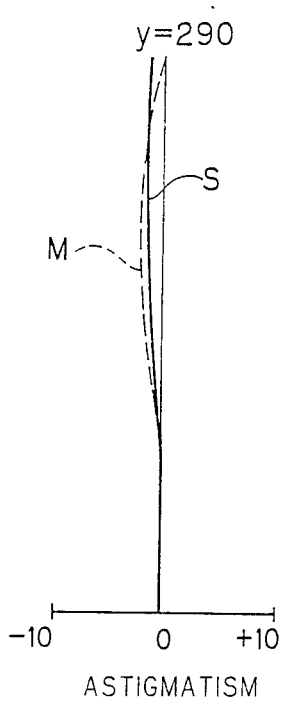
Figure 3:
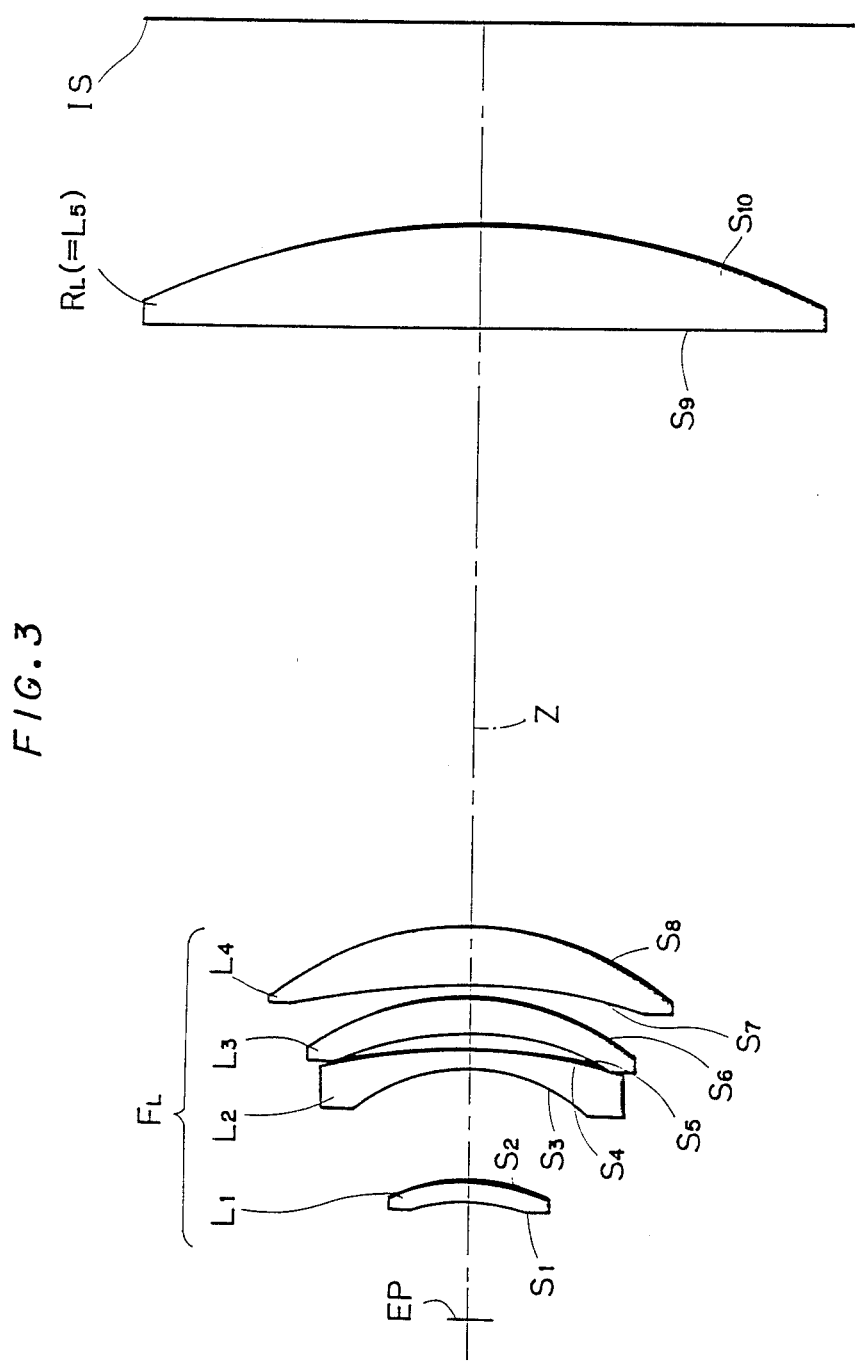
FIG. 3 illustrates an embodiment of a telecentric f-θ lens system according to the present invention.

FIG. 3 illustrates an embodiment of a telecentric f-θ lens system according to the present invention. The f-θ lens system is formed by a rear lens group $R_L$ and a front lens group $F_L$, which are arranged in order from an image formation surface IS side and are disposed at prescribed distances from the surface IS.

The front lens group $F_L$ is formed by first, third and fourth meniscus lenses $L_1$, $L_3$ and $L_4$ having positive power and a second lens $L_2$ having negative power, as shown in FIG. 3. The first to fourth lenses $L_1$ to $L_4$ are arranged in order from an entrance pupil EP side at prescribed intervals. All of the concave surfaces $S_1$, $S_3$, $S_5$ and $S_7$ of the first to fourth lenses $L_1$ to $L_4$ are directed toward the entrance pupil EP.

On the other hand, the rear lens group $R_L$ is formed by a positive power fifth lens $L_5$, a convex surface $S_{10}$ of the fifth lens $L_5$ being directed toward an image formation surface IS.

The f-θ lens system having the aforementioned structure satisfies:

$$-0.65 < (r_1/f) < -0.25 \quad (1)$$

$$0.4 < (d_8/f) < 1.16 \quad (2)$$

$$1.61 < (f_5/f) < 3.5 \quad (3)$$

where $r_1$ represents the radius of curvature of a concave surface $S_1$ of the first lens $L_1$, $d_8$ represents the distance between the fourth and fifth lenses $L_4$ and $L_5$, $f_5$ represents the focal length of the fifth lens $L_5$, and f represents the focal length of the f-θ lens system.

The inequality (1) defines the condition for correcting the spherical aberration and curvature of image surface. That is, when the value $(r_1/f)$ is not less than $-0.25$, correction of the spherical aberration is insufficient to the degree that the curve of astigmatism of the image surface is also inclined toward the negative (−) side, whereby astigmatism at an end of a field angle is increased. When the value $(r_1/f)$ is not more than $-0.65$, on the other hand, the spherical aberration is so excessively corrected that high-order meridional field curvature is increased.

Both the inequalities (2) and (3) define the conditions for assuring that the f-θ lens system has a telecentric property. That is, when the value $(d_8/f)$ is not more than 0.4, not only the f-θ lens system cannot have the telecentric property but high-order meridional field curvature is raised. When the value $(d_8/f)$ is not less than 1.16, on the other hand, the spherical aberration is excessively corrected and both of the meridional and sagittal image surfaces tend to be inclined toward the negative (−) sides.

When the value $(f_5/f)$ is not less than 3.5, both the meridional and sagittal image surfaces are inclined toward the negative (−) sides, and when the value $(f_5/f)$ is not more than 1.61, on the other hand, high-order astigmatism appears on the meridional image surface. In either case, therefore, it is difficult to implement a telecentric optical system which has small spherical aberration etc.

When, to the contrary, an f-θ lens is formed by the first to fifth lenses $L_1$ to $L_5$ and the f-θ lens satisfies the inequalities (1) to (3) (Examples 1 to 8 described below), a telecentric f-θ lens which has the following characteristics is:

(1) The F-number is not more than 20;

(2) the spherical aberration, astigmatism etc. are small; and (3) The image surface is flat.

EXAMPLE 1

Table 1 shows lens data of a telecentric f-θ lens system structured along FIG. 3.

TABLE 1

| i | $r_i$ | $d_i$ | $n_i$ | $\gamma_i$ |
|---|---|---|---|---|
| 1 | −63.355 | 2.10 | 1.78472 | 25.7 |
| 2 | −39.601 | 8.68 | | |
| 3 | −21.347 | 1.00 | 1.51633 | 64.1 |
| 4 | 278.868 | 7.72 | | |
| 5 | −40.414 | 3.50 | 1.78472 | 25.7 |
| 6 | −35.688 | 0.90 | | |
| 7 | −455.490 | 9.20 | 1.78472 | 25.7 |
| 8 | −40.843 | 103.08 | | |
| 9 | ∞ | 10.00 | 1.51633 | 64.1 |
| 10 | −164.656 | | | |

Referring to Table 1, the symbol $r_i$ (i=1, 2, ..., 10) represents the radius of curvature of lens surfaces $S_i$, such that $r_1$ represents the radius of curvature of the concave surface $S_1$ of the first lens $L_1$ and $r_2$ represents the radius of curvature of the convex surface $S_2$ of the first lens $L_1$ directed toward the image formation surface IS. Symbol $d_i$ (i=1, 3, 5, 7, 9) represents the thickness values of the first to fifth lenses $L_1$ to $L_5$, respectively. On the other hand, $d_i$ (i=2, 4, 6, 8) represents spaces between pairs of the first to fifth lenses $L_1$ to $L_5$, respectively, such that $d_2$ represents the space between the first and second lenses $L_1$ and $L_2$, for example. Symbol $n_i$ (i=1, 2, ..., 5) represents indexes of refraction of the first to fifth lenses $L_1$ to $L_5$ with respect to a line d. Symbol $\gamma_i$ (i=1, 2, ..., 5) represents Abbe's numbers of the first to fifth lenses $L_1$ to $L_5$.

The focal length f, the F-number $F_{NO}$ etc. of the telecentric f-θ lens having the aforementioned lens data are set as shown in Table 2.

TABLE 2

| f | $F_{NO}$ | λ | $d_0$ |
|---|---|---|---|
| 100.00 | 20 | 623.8 mm | 15.00 |

Referring to Table 2, $d_0$ represents the space between the entrance pupil EP and the concave surface $S_1$ of the first lens $L_1$. The focal length $f_5$ of the fifth lens $L_5$ is 320, although this is not shown in Tables 1 and 2.

Thus, $r_1/f = -0.634$
$d_8/f = 1.031$
$f_5/f = 3.20$ and it is apparent that the telecentric f-θ lens system satisfies the inequalities (1) to (3).

FIGS. 4A, 4B and 4C illustrate the spherical aberration, astigmatism and f-θ characteristics of the telecentric f-θ lens system having the aforementioned structure, respectively. The results shown in these figures have been obtained with respect to light of 632.8 nm in wavelength on the basis of the above data.

In each of FIG. 4B and FIGS. 5B, 6B, 7B, 8B, 9B, 10B and 11B, which are hereinafter described in detail, symbol S denotes a sagittal image surface and symbol M denotes a meridional image surface, respectively. The f-θ characteristic shown in each of FIGS. 4C, 5C, 6C, 7C, 8C, 9C, 10C and 11C is a value showing the scanning property provided by the following definition assuming that θ represents an angle of polarization and y represents a beam spot position from an optical axis Z on an image formation surface:

$$f\text{-}\theta \text{ characteristic} = \frac{y - f \cdot \theta}{f \cdot \theta} \cdot 100 \ (\%) \qquad (4)$$

EXAMPLE 2

Table 3 shows lens data of a second example according to the telecentric f-θ lens system.

TABLE 3

| i | $r_i$ | $d_i$ | $n_i$ | $\gamma_i$ |
|---|---|---|---|---|
| 1 | −25.000 | 2.00 | 1.78472 | 25.7 |
| 2 | −23.534 | 15.55 | | |
| 3 | −18.738 | 1.00 | 1.71736 | 29.5 |
| 4 | −92.650 | 1.75 | | |
| 5 | −58.459 | 5.50 | 1.78472 | 25.7 |
| 6 | −31.058 | 0.25 | | |
| 7 | −103.512 | 9.00 | 1.78472 | 25.7 |
| 8 | −36.160 | 78.72 | | |
| 9 | ∞ | 11.50 | 1.51633 | 64.1 |
| 10 | −134.791 | | | |

The focal length f, the F-number $F_{NO}$ etc. of the telecentric f-θ lens system having the aforementioned lens data are set as shown in Table 4.

TABLE 4

| f | $F_{NO}$ | λ | $d_0$ |
|---|---|---|---|
| 100.00 | 20 | 623.8 mm | 15.00 |

The focal length $f_5$ of the fifth lens $L_5$ is 261.9, although this is not shown in Tables 3 and 4.

Thus, $r_1/f = -0.25$
$d_8/f = 0.787$
$f_5/f = 2.619$ and it is apparent that the telecentric f-θ lens satisfies the inequalities (1) to (3).

FIGS. 5A, 5B and 5C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 3

Table 5 shows lens data of a third example according to the telecentric f-θ lens system.

TABLE 5

| i | $r_i$ | $d_i$ | $n_i$ | $\gamma_i$ |
|---|---|---|---|---|
| 1 | −49.574 | 2.70 | 1.78472 | 25.7 |
| 2 | −23.680 | 3.40 | | |
| 3 | −17.325 | 1.00 | 1.51633 | 64.1 |
| 4 | 245.713 | 14.13 | | |
| 5 | −54.458 | 3.10 | 1.78472 | 25.7 |
| 6 | −49.970 | 0.50 | | |
| 7 | −159.298 | 9.00 | 1.78472 | 25.7 |
| 8 | −38.543 | 116.00 | | |
| 9 | ∞ | 9.50 | 1.51633 | 64.1 |
| 10 | −176.901 | | | |

The focal length f, the F-number $F_{NO}$ etc. of the telecentric f-θ lens system having the aforementioned lens data are set as shown in Table 6.

TABLE 6

| f | $F_{NO}$ | λ | $d_0$ |
|---|---|---|---|
| 100.00 | 20 | 623.8 mm | 15.00 |

The focal length $f_5$ of the fifth lens $L_5$ is 343.8, although this is not shown in Tables 5 and 6.

Thus, $r_1/f = -0.469$
$d_8/f = 1.16$
$f_5/f = 3.438$ and it is apparent that the telecentric f-θ lens satisfies the inequalities (1) to (3).

FIGS. 6A, 6B and 6C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 4

Table 7 shows lens data of a fourth example according to the telecentric f-θ lens system.

TABLE 7

| i | $r_i$ | $d_i$ | $n_i$ | $\gamma_i$ |
|---|---|---|---|---|
| 1 | −40.018 | 2.00 | 1.71736 | 29.5 |
| 2 | −30.385 | 11.33 | | |
| 3 | −20.391 | 1.00 | 1.78472 | 25.7 |
| 4 | −112.974 | 2.46 | | |
| 5 | −35.100 | 4.20 | 1.71736 | 29.5 |
| 6 | −28.594 | 3.70 | | |
| 7 | −102.502 | 9.50 | 1.71736 | 29.5 |
| 8 | −38.179 | 40.00 | | |
| 9 | ∞ | 14.50 | 1.51633 | 64.1 |
| 10 | −83.148 | | | |

The focal length f, the F-number $F_{NO}$ etc. of the telecentric f-θ lens system having the aforementioned lens data are set as shown in Table 8.

TABLE 8

| f | F$_{NO}$ | λ | d$_0$ |
|---|---|---|---|
| 100.00 | 20 | 623.8 mm | 15.00 |

The focal length f$_5$ of the fifth lens L$_5$ is 161.6, although this is not shown in Tables 7 and 8.
Thus,
r$_1$/f= −0.400
d$_8$/f=0.400
f$_5$/f=1.616
and it is apparent that the telecentric f-θ lens satisfies the inequalities (1) to (3).

FIGS. 7A, 7B and 7C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 5

Table 9 shows lens data of a fifth example according to the telecentric f-θ lens system.

TABLE 9

| i | r$_i$ | d$_i$ | n$_i$ | γ$_i$ |
|---|---|---|---|---|
| 1 | −42.984 | 1.900 | 1.78472 | 25.7 |
| 2 | −34.391 | 12.103 | | |
| 3 | −21.164 | 1.000 | 1.51633 | 64.1 |
| 4 | −495.525 | 5.807 | | |
| 5 | −38.567 | 3.600 | 1.78472 | 25.7 |
| 6 | −34.375 | 0.200 | | |
| 7 | −221.116 | 8.800 | 1.78472 | 25.7 |
| 8 | −40.072 | 71.294 | | |
| 9 | ∞ | 11.600 | 1.51633 | 64.1 |
| 10 | −119.132 | | | |

The focal length f, the F-number F$_{NO}$ etc. of the telecentric f-θ lens system having the aforementioned lens data are set as shown in Table 10.

TABLE 10

| f | F$_{NO}$ | λ | d$_0$ |
|---|---|---|---|
| 100.00 | 18.018 | 632.8 mm | 15.00 |

The focal length f$_5$ of the fifth lens L$_5$ is 231.5, although this is not shown in Tables 9 and 10.
Thus,
r$_1$/f= −0.430
d$_8$/f=0.713
f$_5$/f=2.315
and it is apparent that the telecentric f-θ lens satisfies the inequalities (1) to (3).

FIGS. 8A, 8B and 8C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 6

Table 11 shows lens data of a sixth example according to the telecentric f-θ lens system.

TABLE 11

| i | r$_i$ | d$_i$ | n$_i$ | γ$_i$ |
|---|---|---|---|---|
| 1 | −37.850 | 1.000 | 1.78472 | 25.7 |
| 2 | −29.207 | 8.660 | | |
| 3 | 15.139 | 1.000 | 1.62004 | 36.3 |
| 4 | −101.234 | 2.070 | | |
| 5 | −24.238 | 2.500 | 1.78472 | 25.7 |
| 6 | −21.767 | 0.200 | | |
| 7 | −95.298 | 5.000 | 1.78472 | 25.7 |
| 8 | −24.567 | 105.425 | | |
| 9 | ∞ | 10.000 | 1.51633 | 64.1 |
| 10 | −102.457 | | | |

The focal length f, the F-number F$_{NO}$ etc. of the telecentric f-θ lens system having the aforementioned lens data are set as shown in Table 12.

TABLE 12

| f | F$_{NO}$ | λ | d$_0$ |
|---|---|---|---|
| 100.00 | 20.00 | 632.8 mm | 10.00 |

The focal length f$_5$ of the fifth lens L$_5$ is 199.1, although this is not shown in Tables 11 and 12.
Thus,
r$_1$/f= −0.379
d$_8$/f=1.054
f$_5$/f=1.991
and it is apparent that the telecentric f-θ lens satisfies the inequalities (1) to (3).

FIGS. 9A, 9B and 9C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 7

Table 13 shows lens data of a seventh example according to the telecentric f-θ lens system.

TABLE 13

| i | r$_i$ | d$_i$ | n$_i$ | γ$_i$ |
|---|---|---|---|---|
| 1 | −34.951 | 2.00 | 1.78472 | 25.7 |
| 2 | −29.415 | 10.34 | | |
| 3 | −16.813 | 1.00 | 1.51633 | 64.1 |
| 4 | −106.737 | 1.97 | | |
| 5 | −28.750 | 3.00 | 1.78472 | 25.7 |
| 6 | −25.467 | 0.50 | | |
| 7 | −94.188 | 7.00 | 1.78472 | 25.7 |
| 8 | −29.691 | 96.14 | | |
| 9 | ∞ | 12.00 | 1.51633 | 64.1 |
| 10 | −108.194 | | | |

The focal length f, the F-number F$_{NO}$ etc. of the telecentric f-θ lens system having the aforementioned lens data are set as shown in Table 14.

TABLE 14

| f | F$_{NO}$ | λ | d$_0$ |
|---|---|---|---|
| 100.00 | 18.018 | 632.8 mm | 10.00 |

The focal length f$_5$ of the fifth lens L$_5$ is 210.2, although this is not shown in Tables 13 and 14.
Thus,
r$_1$/f= −0.350
d$_8$/f=0.961
f$_5$/f=2.102
and it is apparent that the telecentric f-θ lens satisfies the inequalities (1) to (3).

FIGS. 10A, 10B and 10C illustrate the spherical aberration, astigmatism and f-θ characteristics of the telecentric f-θ lens having the aforementioned structure, respectively. The results shown in these figures have been obtained with respect to light of 632.8 nm in wavelength on the basis of the above data.

EXAMPLE 8

Table 15 shows lens data of a seventh example according to the telecentric f-θ lens system.

TABLE 15

| i | $r_i$ | $d_i$ | $n_i$ | $\gamma_i$ |
|---|---|---|---|---|
| 1 | −39.861 | 2.00 | 1.78472 | 25.7 |
| 2 | −33.433 | 11.19 | | |
| 3 | −17.846 | 1.00 | 1.51633 | 64.1 |
| 4 | −141.271 | 2.42 | | |
| 5 | −29.362 | 3.00 | 1.78472 | 25.7 |
| 6 | −26.362 | 0.50 | | |
| 7 | −119.853 | 7.00 | 1.78472 | 25.7 |
| 8 | −31.782 | 98.33 | | |
| 9 | ∞ | 12.00 | 1.51633 | 64.1 |
| 10 | −112.015 | | | |

The focal length f, the F-number $F_{NO}$ etc. of the telecentric f-θ lens system having the aforementioned lens data are set as shown in Table 16.

TABLE 16

| f | $F_{NO}$ | λ | $d_0$ |
|---|---|---|---|
| 100.00 | 18.018 | 488 mm | 10.00 |

The focal length $f_5$ of the fifth lens $L_5$ is 214.7, although this is not shown in Tables 15 and 16.

Thus, $r_1/f = -0.399$
$d_8/f = 0.983$
$f_5/f = 2.147$ and it is apparent that the telecentric f-θ lens satisfies the inequalities (1) to (3).

FIGS. 11A, 11B and 11C illustrate the spherical aberration, astigmatism and f-θ characteristics of the telecentric f-θ lens having the aforementioned structure, respectively. The results shown in these figures have been obtained with respect to light of 488 nm in wavelength on the basis of the above data.

The spherical aberration of the f-θ lens system is extremely small as understood from the spherical aberration diagrams (FIGS. 4A, 5A, 6A, 7A, 8A, 9A, 10A and 11A), and the astigmatism thereof is also extremely small as understood from the astigmatism diagrams (FIGS. 4B, 5B, 6B, 7B, 8B, 9B, 10B and 11B). Further, the f-θ lens system structured as above has an excellent f-θ characteristic, as understood from the f-θ characteristic diagrams (FIGS. 4C, 5C, 6C, 7C, 8C, 9C, 10C and 11C).

As shown in the spherical aberration diagrams and the astigmatism diagrams, the curves of the spherical aberration and astigmatism of the f-θ lens system are inclined toward the same direction. In Example 6, for example, the curve of the spherical aberration is inclined toward the negative side (see FIG. 9A), while the curve of the astigmatism is also inclined toward the negative side (see FIG. 9B). Thus, a flat image surface can be obtained, which is formed by putting together with least circles of confusion.

Further, all the F-numbers $F_{NO}$ of the f-θ lens systems are not more than 20 in Examples 1 to 8, as hereinabove described. Therefore, when the aforementioned f-θ lens is applied to an optical beam scanner shown in FIG. 12, the beam spot diameter can be easily reduced to thereby improve resolution of the scanner.

Figure 12:
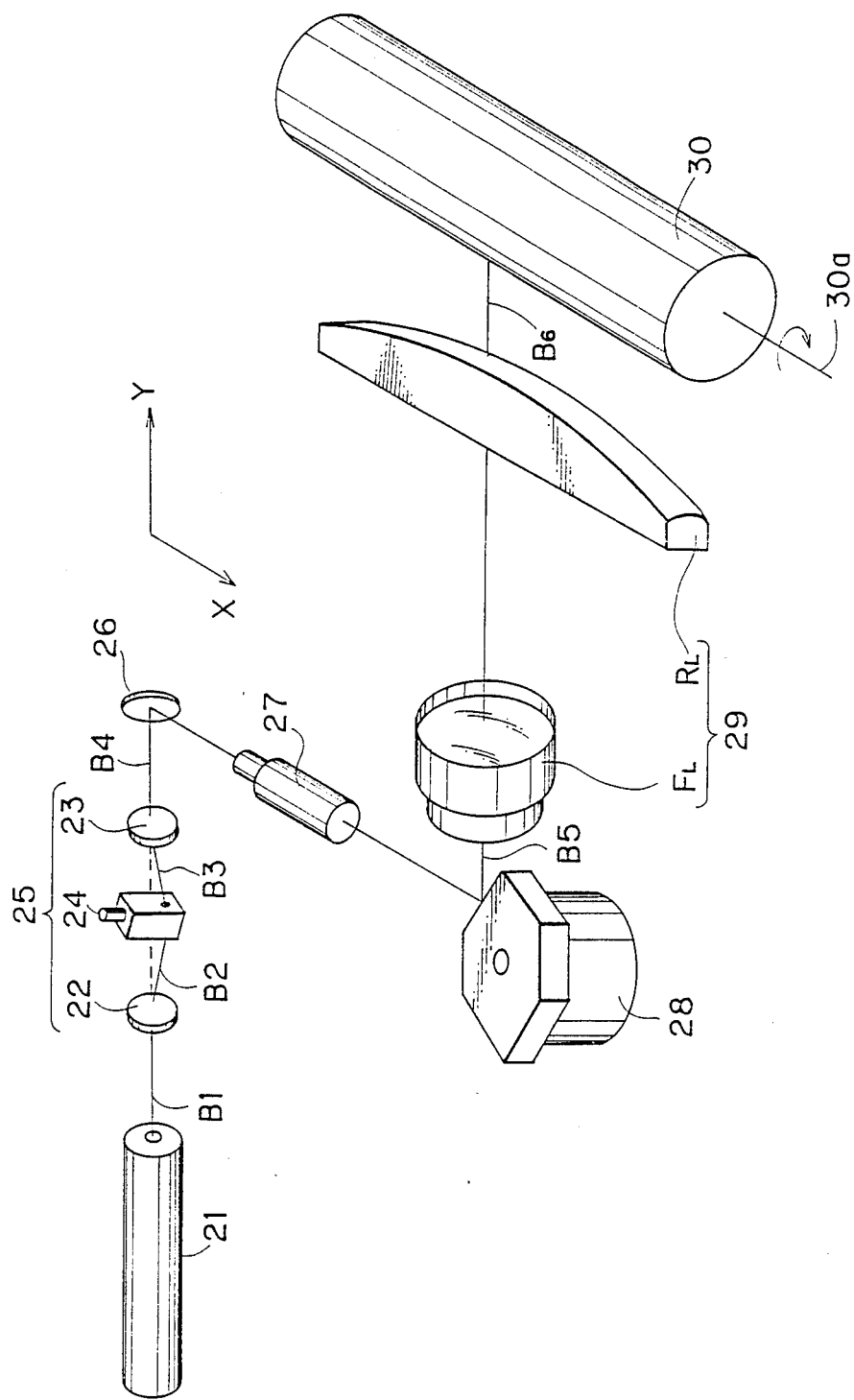
FIG. 12 is a perspective view showing an optical system of the optical beam scanner.

FIG. 12 is a perspective view showing an optical system of an optical beam scanner to which the aforementioned telecentric f-θ lens system is applied. Referring to FIG. 12, a laser beam $B_1$ going out from a laser tube 21 is impinges upon an optical modulator system 25 which is formed by lenses 22 and 23 and an acoustic optical modulation element 24. In the optical modulator system 25, the beam $B_1$ enters the lens 22 at a prescribed angle to an optical axis of the lens 22 to be inclined by a prescribed angle from the horizontal plane (X-Y plane), so that a laser beam $B_2$ then enters the acoustic optical modulation element 24. This laser beam $B_2$ is on-off controlled on the basis of a signal which corresponds to an image to be recorded on a drum 30, which will be hereinafter described in detail. A laser beam $B_3$ going out from the acoustic optical modulation element 24 with inclination from the horizontal plane (X-Y plane) is corrected to a horizontal laser beam $B_4$ by the lens 23.

The laser beam $B_4$ is reflected by a mirror 26, is passed through a beam expander 27 and is made to impinge upon a polygon mirror 28 which is rotated at a constant angular velocity. Since a diameter of a laser beam $B_5$ reflected by the polygon mirror 28 is varied according to an area of the reflecting surface thereof, the polygon mirror 28 performs not only as a deflector but also as an apperture stop, so that an entrance pupil of a telecentric f-θ lens system 29, which is structured along FIG. 3, is located on the reflecting surface of the polygon mirror 28. The laser beam $B_5$ reflected by the polygon mirror 28 is imaged on the drum 30 through the telecentric f-θ lens system 29. Therefore, a laser beam $B_6$ applied onto the drum 30 through the polygon mirror 28 and the telecentric f-θ lens system 29 performs scanning in a direction parallel to the axis 30a of rotation of the drum 30, i.e., the so-called primary scanning direction X.

The drum 30 is coupled with a driving part (not shown) to be rotated about the rotation axis 30a by the driving part for subscanning.

As hereinabove described, the above telecentric f-θ lens system 29 having a small F-number can be applied to the optical system of the optical beam scanner shown in FIG. 12, whereby the beam spot diameter of the laser beam $B_6$ can be easily reduced to improve resolution of the optical beam scanner.

Although the present invention has been described and illustrated in detail, it is to be clearly understood that the same is by way of illustration and example only and is not to be taken by way of limitation. The spirit and scope of the present invention should be limited only by the terms of the appended claims.

What is claimed is:
1. A telecentric f-θ lens system, comprising:
   (a) a first lens group having an entrance pupil, which includes
      (a-1) a first lens in the form of meniscus having a positive power, said first lens having a concave surface which is directed to said entrance pupil,
      (a-2) a second lens having a negative power, and
      (a-3) third and fourth lenses in the form of meniscus having a positive power, respectively; and
   (b) a second lens group including a fifth lens having a positive power, said first through fifth lenses being successively disposed in order from said entrance pupil side.
2. A telecentric f-θ lens system of claim 1 wherein said telecentric f-θ lens system satisfies:

$$-0.65 < (r_1/f) < -0.25$$

$$0.4 < (d_8/f) < 1.16$$

$$1.61 < (f_5/f) < 3.5$$

where $r_1$ is a radius of curvature of said concave surface of said first lens; f is a focal length of the system; $d_8$ is a distance between said fourth and fifth lenses; and $f_5$ is a focal length of said fifth lens.

3. A scanning system for scanning an optical beam on a recording surface, said scanning system comprising:
- a light source for generating an optical beam;
- a deflector for deflecting the optical beam going out from said light source; and
- a telecentric f-$\theta$ lens system for imaging the optical beam deflected by said deflector on said recording surface, said telecetric f-$\theta$ lens system comprising: (a) a first lens group having an entrance pupil, which includes (a-1) a first lens in the form of meniscus having a positive power, said first lens having a concave surface which is directed to said entrance pupil, (a-2) a second lens having a negative power, and (a-3) third and fourth lenses in the form of meniscus having a positive power, respectively; and (b) a second lens group including a fifth lens having a positive power, said first through fifth lenses being successively disposed in order from said entrance pupil side.

4. A scanning system of claim 3 wherein said telecentric f-$\theta$ lens system satisfies:

$$-0.65 < (r_1/f) < -0.25$$

$$0.4 < (d_8/f) < 1.16$$

$$1.61 < (f_5/f) < 3.5$$

where $r_1$ is a radius of curvature of said concave surface of said first lens; f is a focal length of the system; $d_8$ is a distance between said fourth and fifth lenses; and $f_5$ is a focal length of said fifth lens.

* * * * *